United States Patent Office 2,729,607
Patented Jan. 3, 1956

2,729,607

CATION EXCHANGE RESIN

Karl Haagen, Leverkusen-Bayerwerk, Germany, assignor to Farbenfabriken Bayer Aktiengesellschaft, Leverkusen, Germany, a corporation of Germany No Drawing. Application March 5, 1952,
Serial No. 275,011

Claims priority, application Germany March 7, 1951

14 Claims. (Cl. 260—2.2)

The present invention relates to cation-exchange resins and more particularly to cation-exchange resins containing groups of different acidity, preferably sulfonic acid and carboxylic acid groups, and to processes of producing such exchange resins.

In my co-pending application Ser. No. 210,793 filed February 13, 1951, now U. S. Patent No. 2,692,866 I have described cation-exchangers produced from ethers of aromatic hydroxy compounds. These exchange resins contain as active groups either sulfonic or carboxylic acid groups. They are obtained by condensing in an acid medium aldehydes or substances yielding aldehydes and ethers of aromatic mono- or polyhydroxy compounds wherein preferably all the hydroxy groups are etherified, said ethers containing already the active groups for ion exchange and/or the active groups being introduced with the aldehydes. Condensation is preferably carried out in a strongly acid medium at temperatures up to 115° C. An especially suitable aldehyde is formaldehyde. The process according to the invention may also be performed by precondensing the above ethers with aldehydes, for instance, benzaldehyde, that may contain the active groups for ion exchange, such as, for instance, benzaldehyde disulfonic acid or acetaldehyde disulfonic acid.

By drying the gels at 100–120° C., after washing in the usual manner, substantially cross-linked condensation products are obtained which, as to their insolubility in water, are by no means inferior to the compounds hitherto obtained from aromatic mono- and polyhydroxy compounds, but which are far superior as to their stability to alkalies and oxidizing agents.

Suitable ethers for use in the process are ethers of aromatic mono- or polyhydroxy compounds in which the second ether component is of aliphatic or aromatic nature, such as in the case of arylalkyl ethers and diaryl ethers. As examples may be mentioned anisol, diphenyl ether, phenoxy ethane sulfonic acid, and phenoxy acetic acid. The ether bridge may also be a part of another nucleus, such as in the case, for instance, of diphenylene oxide and diphenylene dioxide.

The ethers may sometimes contain small amounts of free hydroxy groups; the stability to alkalies and oxygen of the exchange resins prepared from the latter is not essentially reduced as compared with the resins produced from pure ethers. The cation-exchanging properties of these resins in most cases meet with the practical demands.

Examples of suitable active groups capable of forming salts with alkalies are, besides the sulfonic and carboxylic acid group, sulfonamide and cyanamide groups and nitroalkyl groups. The active groups may be attached in the ethers to the aromatic nucleus either directly or via an aliphatic side chain. Arylalkyl ethers of particular usefulness are those in which the active groups are terminally linked to an alkyl radical, for instance, phenoxy acetic acid and phenoxy ethane sulfonic acid. The active groups may also be introduced with an aldehyde component, for instance, with benzaldehyde disulfonic acid.

In many cases it is not necessary to prepare the starting materials to be employed for condensation in pure form or to recover them from their solutions. If, for instance, the sulfonic acid group is introduced as active group for ion exchange by sulfonating an aromatic ether, condensation of the ether containing the sulfonic acid group with aldehyde may be performed in the sulfonation mixture. After gel formation the excess sulfuric acid is removed from the resin by washing with water.

One object of the invention is to provide cation exchange resins having a high cation exchange capacity which contain, besides etherified aromatic hydroxy groups, groups of different acidities, preferably sulfonic and carboxylic acid groups.

Another object of the invention is to provide a process of producing such cation exchange resins.

Further objects will become apparent as the following description proceeds.

It has been found that cation exchange resins containing etherified aromatic hydroxy groups and cation exchanging groups of different acidities, such as sulfonic and carboxylic acid groups, may be produced by the process described in my copending application Ser. No. 210,793.

The new exchange resins, resistant to alkalies and oxygen, are produced by condensing, in an acid medium, ethers of aromatic hydroxyl compounds containing groups of different acidities, for instance sulfonic and carboxylic acid groups with aldehydes or aldehyde yielding compounds. The exchange resins of the present invention may be further obtained from at least two components capable of being condensed by aldehydes provided that each of at least two of said components contains only one, but not the same kind of ion exchanging groups and at least one of said components contains one or more etherified aromatic hydroxy groups, and that said components are condensed with aldehydes to form cross-linked hydrogels which are hardened in the usual manner. It is within the scope of the invention to employ in the production of cation exchange resins the starting materials obtained by condensing 1 mol of an aldehyde carboxylic acid and 2 mols of an aromatic sulfonic acid containing at least one etherified phenolic hydroxyl group, or by condensing 2 mols of phenoxy acetic acid and 1 mol of benzaldehyde disulfonic acid which condensation gives rise to the formation of a triphenyl methane derivative of the following structural formula:

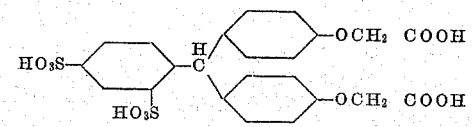

Examples of further suitable starting materials for the production of exchangers according to the invention are, for instance, mixtures containing phenoxy acetic acid and the sulfonic acid of a polycyclic hydrocarbon or of an aromatic ether, like for instance diphenyl ether and anisol, or of a cyclic ether, like for instance diphenylene oxide or diphenylene dioxide. It may sometimes be of advantage to previously condense both components separately with aldehyde and then to mix the resulting higher molecular weight condensation products in form of their viscous solutions and to form a gel by subjecting the combined solutions to after-condensation. When starting from components of different reactivity to aldehydes it is advantageous to condense the lesser reactive component with aldehyde before mixing same with the other component.

The new cation exchange resins may successfully be used for carrying out the well-known exchange reactions, furthermore as adsorbents for purifying liquid and gaseous systems. They are particularly suited for simultaneously removing hardness and bicarbonate ions from boiler feed water by the process of acid-salt regeneration.

The following examples illustrate some ways of preparing suitable cation exchange resins. However, the invention is not limited to these procedures but may otherwise be practiced within the scope of the appended claims, the parts given in the examples being by weight.

*Example 1*

848 parts of the sodium salt of benzaldehyde disulfonic acid (containing 62.7 per cent calculated on the molar weight 266) and 800 parts of phenoxy acetic acid (containing 92.3 per cent calculated on the molar weight 152) are introduced into 1000 parts of 70 per cent sulfuric acid at 90–100° C. After about half an hour's stirring a further 435 parts of phenoxy acetic acid are added. When the condensation is complete the mixture is allowed to cool; thereupon 1200 parts of 30 per cent formalin are added to the mixture which is heated to 100° C. The clear solution soon becomes more viscous and solidifies to a homogeneous hydrogel which after about 20 hours is heated in a closed vessel to 100° C. and subsequently dried at 110° C. The yield amounts to 2495 parts of xerogel which is ground, sifted and introduced into a 20 per cent sodium chloride solution for swelling. The salt solution is gradually diluted with water and finally entirely displaced by water. The exchanger is stable to hot alkaline water, shows a high exchanging capacity and is particularly suited for removing hardness and bicarbonate ions from boiler feed water.

*Example 2*

700 parts of naphthalene are sulfonated with 800 parts of sulfuric acid monohydrate at 160° C. After cooling to about 100° C. the sulfonation mixture is introduced with stirring into a suspension of 2715 parts of phenoxy acetic acid of 83.9 per cent strength in 4600 parts of formalin and the reaction mixture is heated to about 85° C. The reaction temperature rapidly increases. The heat evolved in the exothermic condensation reactions causes an intense boiling of the solution which gradually becomes more viscous and finally solidifies to a homogeneous clear gel. The product is heated in a closed vessel to 95° C. for about 24 hours and thereafter dried in the air at 110° C. for 3–4 days. 3900 parts of xerogel are obtained which is ground, sifted and swelled as indicated in Example 1.

The ratio of naphthalene sulfonic acid to phenoxy acetic acid may be varied over a fairly wide range so that any desired proportion of the active groups can be easily controlled in the condensation mixture.

*Example 3*

500 parts of technical acenaphthene are heated with 500 parts of 100 per cent sulfuric acid to 145° C. for 6 hours. After cooling to about 100° C. the suspension mixture is introduced with stirring into a suspension of 427 parts of 88.9 per cent phenoxy acetic acid in 1200 parts of 30 per cent formalin. While the temperature of the mixture gradually increases, the phenoxy acetic acid is completely dissolved. The solution becomes more viscous with increasing temperature and after adding 60 parts of paraformaldehyde presently solidifies to a dark, clear gel. The gel is heated in a closed vessel to 85–90° C. for 12–16 hours and subsequently dried in the air at 110° C. for 2 days. The yield amounts to 1585 parts of dried resin which is ground and swelled in water. The exchanger is excellently suited for removing hardness and bicarbonate ions from water.

I claim:

1. The process of producing water insoluble cation exchanging resins which comprises condensing in an acid medium at elevated temperature aromatic compounds capable of condensing with formaldehyde which compounds contain sulfonic acid and carboxylic acid groups but substantially no free phenolic groups, and at least one of which contains a phenolic group etherified with a member of the class consisting of aromatic and aliphatic compounds, with a compound selected from the group consisting of formaldehyde and formaldehyde yielding substances, continuing condensation to form a gel and drying the gel at elevated temperature.

2. The process according to claim 1, wherein one of the aromatic compounds contains a sulfonic acid group and another, a carboxylic acid group.

3. The process according to claim 2, wherein the compound containing a carboxylic acid group is an aralkyl ether, in which the alkyl radical contains a carboxylic acid group.

4. The process according to claim 3, wherein the compound containing a carboxylic acid group is phenoxy acetic acid.

5. The process according to claim 2, wherein the aromatic compound containing a sulfonic acid group is a sulfonated aromatic hydrocarbon.

6. The process according to claim 1, wherein one of the aromatic compounds used contains an aldehyde group which is reacted with at least one of the other aromatic compounds, whereafter the reaction product obtained is condensed with a compound selected from the group consisting of formaldehyde and formaldehyde yielding substances.

7. The process according to claim 6, wherein the aromatic compound containing an aldehyde group is a benzaldehyde containing at least one sulfonic acid group.

8. The process according to claim 6, wherein the aromatic compound containing an aldehyde group is a benzaldehyde containing at least one carboxylic acid group.

9. The process according to claim 6, wherein the aromatic compound reacted with the aldehyde is an aromatic sulfonic acid containing at least one etherified phenolic hydroxyl group.

10. The process according to claim 6, wherein the aromatic compound reacted with the aldehyde is phenoxy acetic acid.

11. A water insoluble cation exchanging solid resin consisting of an aromatic formaldehyde condensation product containing carboxylic and sulfonic acid groups and phenolic hydroxy groups which are etherified with a member of the class consisting of aromatic and aliphatic compounds, said resins being substantially free of unetherified phenolic hydroxyl groups.

12. A water insoluble cation exchanging solid resin according to claim 11 containing a phenoxy acetic acid group.

13. A water insoluble cation exchanging solid resin resulting from the process of claim 1.

14. A process of removing cations from a liquid medium which comprises contacting such medium with a cation exchanging resin obtained by the process of claim 1.

References Cited in the file of this patent

UNITED STATES PATENTS

| | | |
|---|---|---|
| 2,191,853 | Holmes | Feb. 27, 1940 |
| 2,259,503 | Wasseneger | Oct. 21, 1941 |
| 2,319,359 | Wasseneger | Mar. 18, 1943 |

FOREIGN PATENTS

| | | |
|---|---|---|
| 952,068 | France | Apr. 25, 1949 |
| 829,498 | Germany | Jan. 28, 1952 |

OTHER REFERENCES

Lautsch: "Die Chemie," vol. 57, pages 149–154 (1944).

Gortner et al.: "Outlines of Biochemistry" 3d ed., 1949, pages 742 to 745, 751 to 753.

Brauns: "Paper Trade Journal," Oct. 31, 1940, pages 33 and 37.